United States Patent Office 3,086,515
Patented Apr. 23, 1963

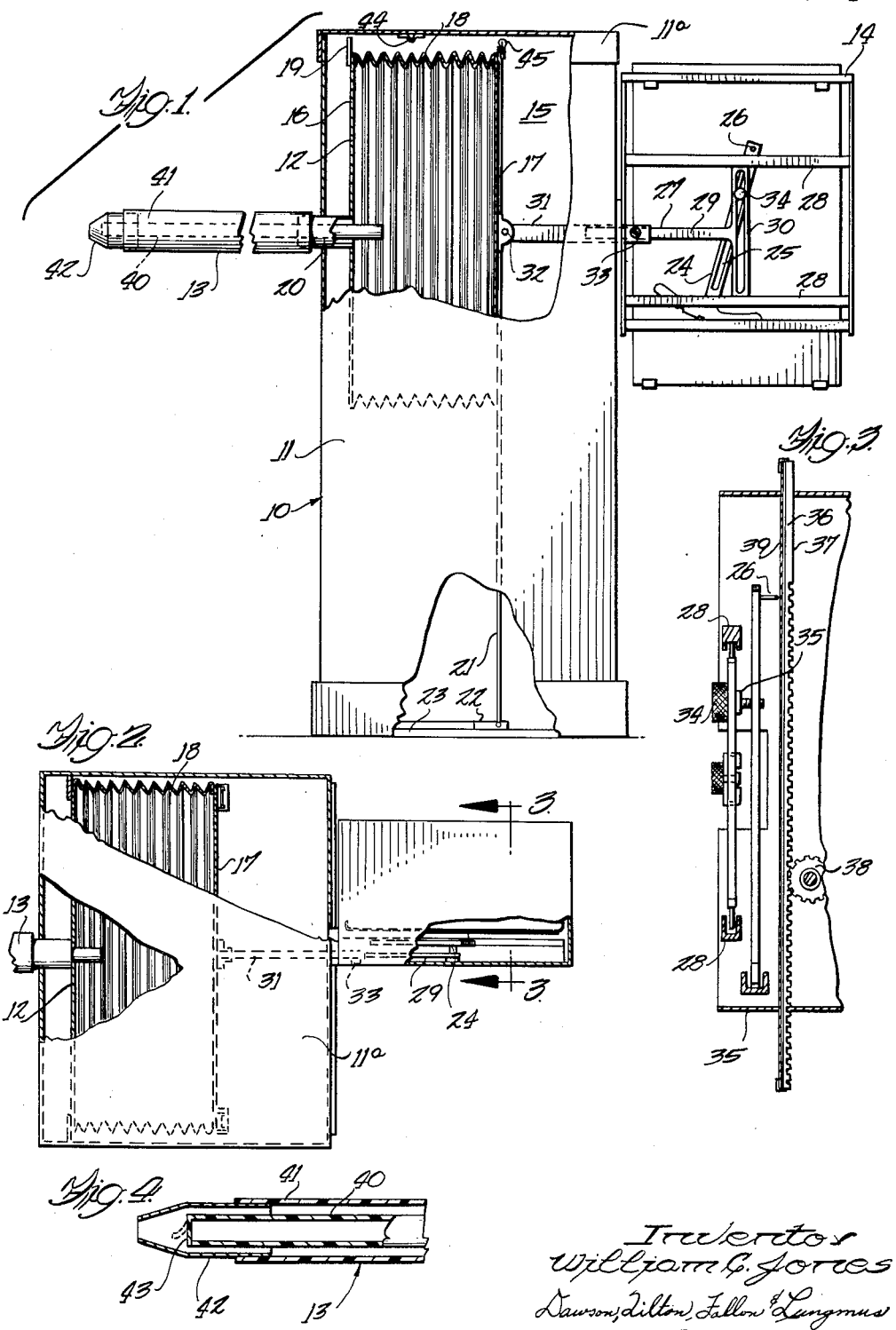

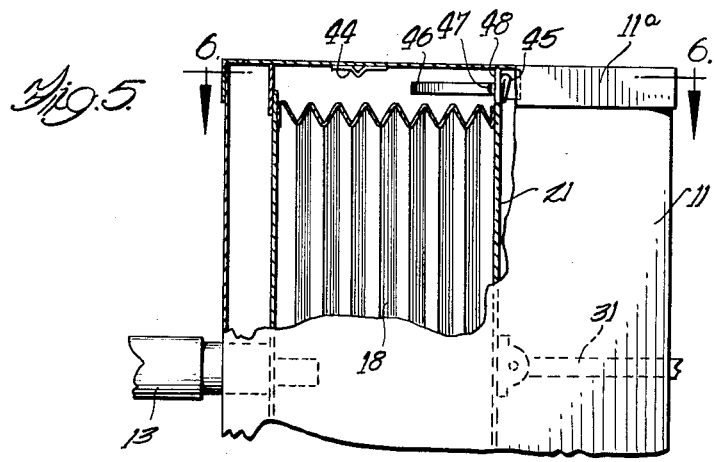
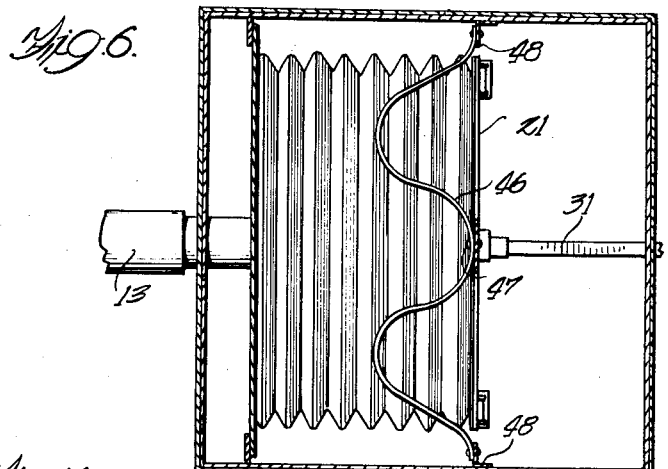
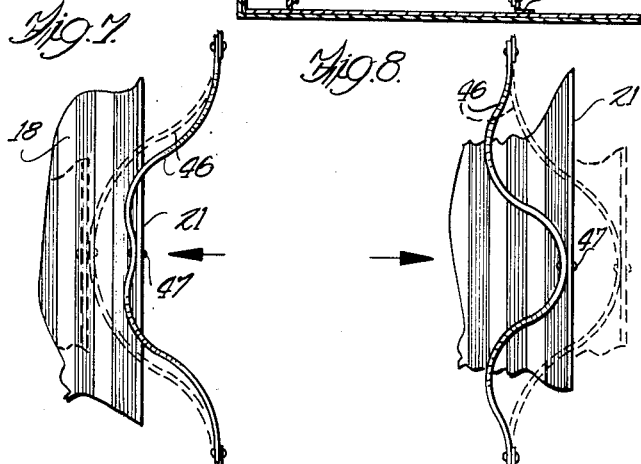

3,086,515
RESPIRATION TESTING APPARATUS
William C. Jones, 16 W. 328 Walnut Lane,
Timber Trails, Elmhurst, Ill.
Filed Feb. 20, 1961, Ser. No. 90,405
13 Claims. (Cl. 128—2.08)

This invention relates to respiration testing apparatus and, more specifically, to a device particularly suited for use in pulmonary function analysis.

Pulmonary function testing equipment ordinarily consists of an inverted canister supported for vertical movement while partially immersed a body of liquid such as water. As a subject breathes into the canister, the expired air fills the space therein above the water level and the extent of upward movement of the canister is recorded. Since the position of the canister depends upon the volume of air contained therein, the breathing characteristics of a subject may be graphically represented by plotting the changes in position of the canister over a given period of time.

While the use of water or a liquid in such an apparatus is in one sense desirable because of the low frictional resistance to canister movement, this advantage is more than offset by the disadvantages or defects inherent in a liquid-containing apparatus. For instance, as the canister moves there is ordinarily a variance between the inside and outside liquid levels and this "manometer effect" necessarily imparts considerable inaccuracy in the results of volumetric tests. A bouncing action of the canister may occur and, because of the manometer effect, there may be considerable overshooting and undershooting of the canister at the limits of its range of movement. Further inaccuracy may occur because of the solubility of the gas in the body of liquid.

Accordingly, it is a main object of the present invention to provide a pulmonary function testing apparatus of simple construction and reliable operation which overcomes the aforementioned defects and disadvantages of liquid-containing devices. Another object is to provide a respiration testing device which is highly responsive and which is capable of recording with a relatively high degree of accuracy the breathing characteristics of a subject. Another object is to provide a respiration testing device equipped with recording means which is adjustable to obtain a full range of stylus movement regardless of the subject's vital capacity. A further object is to provide a respiration testing device in which the problems of carbon dioxide build-up, and the stimulations which would normally arise therefrom, are overcome or greatly reduced. A still further object is to provide a bellows-equipped respiration testing apparatus in which spring means are provided to compensate for the inherent resistance of the bellows to expansion and contraction.

Other objects will appear from the specification and drawings in which:

FIGURE 1 is a side elevational view taken partly in section and showing a respiration testing device embodying the present invention;

FIGURE 2 is a top plan view, taken partly in section, of the device;

FIGURE 3 is an enlarged broken vertical sectional view taken along line 3—3 of FIGURE 2;

FIGURE 4 is an enlarged view of the breathing tube and mouth piece and illustrating structural details thereof;

FIGURE 5 is a side elevational view taken partly in section and showing a modification of the respiration testing device;

FIGURE 6 is a top plan view of the apparatus with the cover removed therefrom;

FIGURE 7 is a simplified and fragmentary top plan view of the apparatus illustrating the condition of the spring means when the bellows is partially compressed;

FIGURE 8 is a simplified and fragmentary top plan view similar to FIGURE 7 but showing the spring means when the bellows is partially expanded.

In the embodiment of the invention illustrated in the drawings, the numeral 10 generally designates a respiration testing device having a casing 11, a bellows 12 within the casing, a breathing tube 13 communicating with the bellows, and recording means 14 secured to the casing and operatively associated with the bellows for recording the expansions and contractions thereof. The casing is provided with a removable cover 11a or with any other suitable means for gaining access to the casing chamber 15.

Bellows 12 is oriented for horizontal expansion and contraction within the chamber 15 of the casing and consists essentially of vertical end plates 16 and 17, and an accordion-pleated body 18 formed of rubber or any other suitable non-porous and flexible sheet material. End plate 16 is stationary, being fixed in position by supporting brackets 19 and by the rigid sleeve portion 20 of breathing tube 13. As shown most clearly in FIGURE 1, sleeve 20 extends through both the vertical wall of the casing 11 and the apertured wall of the stationary end plate 16 and may be welded or otherwise secured to the casing wall and end plate to assist in maintaining the plate immovable within the casing.

Bellows end plate 17 is movable and is secured to the upper end of an upstanding support member 21. The lower end of the support member is hingedly connected by hinge elements 22 to the base 23 of the casing for swinging movement of the support member about a horizontal axis lying along the plane of the movable end plate 17. It will be observed that the support member is mounted so that it is in a vertical neutral state when the bellows is also in a neutral state, that is, when the bellows is neither compressed nor expanded.

The recording means 14 includes a rocker member 24 having a slotted upstanding portion 25 equipped at its upper end with a stylus 26. A T-shaped member 27 is slidably carried for horizontal movement by upper and lower tracks 28 and has a horizontal arm 29 and a slotted vertical arm 30. The remote end of the horizontal arm is received within a channel-shaped connecting bar 31 which is pivotally connected to the upstanding support member 21 by pin 32. The connecting bar and the horizontal arm received therein may be secured against telescoping expansion or contraction by a locking screw 33.

The amplitude of movement of the stylus depends not only upon the extent of expansion and contraction of the bellows but also upon the location of the point of connection between the slotted-shaped member 27 and the slotted rocker member 24. As shown in FIGURES 1 and 3, a volume setting screw 34 passes through the slots of both members. A locking unt 35 is slidable along the vertical slot of member 27 and may be drawn into tight engagement with that member upon rotation of the volume setting screw to hold the screw in any selected position along the slot of the T member. It is believed apparent that when the volume setting screw is located near the lower end of the slots of the members the amplitude of swing of the rocker member will be at a maximum and when the setting screw is located at the upper ends of the slots the amplitude will be at a minimum and only slightly greater than the extent of horizontal movement of the T-shaped member itself. Since the volume setting screw may be located at any point along the slots of the members, an infinite number of positions are available for achieving the desired amplitude of movement of the rocker arm and its stylus for any given range of movement of the T member and the movable bellows plate to which it is connected.

In other respects, recording means 14 is entirely conventional and, for that reason, a general description is believed sufficient. The frame 35 to which the horizontal tracks 28 are connected supports a vertical platen 36 for vertical sliding movement. The platent is equipped with a rack gear 37 which operatively engages a drive gear 38 powered by a clock mechanism of any suitable driving means. As the drive gear slowly rotates, the platen descends, carrying with it a sheet of suitable graph paper 39 which is etched or marked by the oscillating stylus. While a flat platen is illustrated in the drawings, it is to be understood that other types of movable supporting means for the recording paper might be used such as, for example, a rotating drum.

The breathing tube 13 is illustrated most clearly in FIGURES 1 and 4 and comprises a pair of concentric inner and outer flexible tubes 40 and 41 respectively. At its free end, the breathing tube assembly is equipped with a mouth piece 42 which is adapted to communicate with both of the concentric passages of the inner and outer tubes. At its opposite end, the outer tube is secured to sleeve 20 and communicates with the passage of that sleeve. The inner tube passes from the mouth piece through the entire length of the outer tube and terminates within bellows 12. It will be observed from FIGURE 4 that the end of the inner tube disposed within mouth piece 42 is equipped with a flap check valve 43 which prevents air from entering the bellows through the inner tube but does not restrain the outward flow of air through that tube.

By reason of flap valve 43, the inspiration flow capacity of the breathing tube assembly 13 is greater than its exhalation flow capacity. It will also be noted that air drawn through the inner tube 40 is necessarily taken from the interior of the bellows. Since the carbon dioxide concentration in the interior of the bellows will in most cases tend to be less than the concentration in the recently expired air within the passage of outer tube 41, the provision of concentric tubes, one of which is equipped with a check valve, tends to reduce carbon dioxide build-up and the stimulation to a subject's respiration which might otherwise be produced thereby. Avoidance of carbon dioxide stimulation is particularly important in timed breathing tests, such as a minute ventilation test, where the normal breathing pattern of the subject is to be tested and considered.

Upon the underside of the casing's roof is an abutment member 44 which is adapted to be engaged by a lug 45 carried at the upper end of support member 21. At least one of these elements, preferably lug 45, is formed of resilient material such as rubber. When the bellows is contracted, the rubber loop or lug 45 may be hooked behind the abutment 44. Because of its resiliency, the lug provides only slight resistance to expansion of the bellows, the resistance being just sufficient to overcome any tendency of the bellows to expand on its own accord by reason of the flexible material from which it is formed. As soon as a subject exhales into the breathing tube, lug 45 disengages from the abutment 44 and the movable end plate of the bellows swings away from the stationary plate. Stop or abutment member 44 therefore constitutes positioning means for maintaining the movable plate of the bellows to one side for a constant reference point which is counterbalanced until air is introduced through the breathing tube.

From the foregoing, it is believed apparent that in the operation of the apparatus embodying the present invention the movable bellows plate 17 swings between positions on opposite sides of a neutral position; that is, on opposite sides of a position in which support member 21 is vertical and in which the accordion folded walls of the bellows are neither compressed nor expanded. This is achieved, as already described, by starting the operation of the apparatus with the bellows in a state of slight compression. Since the bellows is in a balanced condition when the movable end plate is vertically disposed, and since the weight of the end plate is supported by the pivotally mounted support member 21, the only resistance imposed by the apparatus to the inhalation and expiration by a subject is the very slight resistance of the bellows to expansion and contraction.

The modified structure illustrated in FIGURES 5 through 8 is substantially identical to the apparatus already described except for the addition of a compensating spring 46. As shown most clearly in FIGURE 6, the serpentine spring 46 is generally W-shaped and has its intermediate arch connected by rivet 47 or by any other suitable connecting means to the central upper edge portion of movable support member 21. The ends of the horizontally-extending spring are fixed to inwardly projecting bracket elements 48 provided by opposite side walls of the casing 11. It will be noted that the ends and intermediate portion of the spring all extend along the same vertical plane, and that such plane is parallel with the plane of support member 21, when the bellows 18 is in the neutral state illustrated in FIGURES 5 and 6.

Spring 46 is also in a neutral state when it assumes the configuration shown in FIGURES 5 and 6. However, the spring is formed from generally straight stock and, should its central portion be urged horizontally in either direction along a line equidistant from its ends, the spring will tend to assume the shape of a U. In other words, the spring as shown in FIGURE 6 is in a neutral but unstable condition and, if any force is exerted in the directions of the arrows of FIGURES 7 or 8 the spring will tend to exert a progressively increasing force in the same respective direction to assume the U-shaped condition represented by the broken lines. If the central portion of the spring is urged to the left then the tension of the spring will tend to flatten out the central arch (FIGURE 7) and, finally, the central portion of the spring will assume a curvature of the same direction as the immediately adjacent lateral portions. Conversely, if the central portion of the spring is urged to the right, the curved lateral portions will tend to flatten out (FIGURE 8) until finally only a single enlarged central arch remains.

It has been found that by providing the apparatus with a light sinuous spring of the type described, the slight resistance of the bellows to either expansion or contraction is nullified. As the movable end plate of the bellows moves in either direction from a neutral vertical position, the resistance of the bellows progressively increases and this resistance is counterbalanced by the progressively increasing and opposing force of the spring as its central portion is moved in either direction with the bellows end plate. It is believed evident, therefore, that the modified construction of FIGURES 5 through 8 is extremely sensitive and responsive and is capable of recording with a relatively high degree of accuracy the breathing characteristics of a subject.

While in the foregoing I have disclosed two embodiments of the present invention in considerable detail for purposes of illustration, it will be understood by those skilled in the art that many of these details may be varied without departing from the spirit and scope of the invention.

I claim:

1. In a respiration testing device, a horizontal bellows having a movable end plate and a stationary end plate, a breathing tube communicating with said bellows, support means supporting said movable end plate for horizontal movement on opposite sides of an intermediate position in which said bellows is in a neutral state, recording means connected to said movable end plate for recording the movement thereof as air is drawn into and removed from said bellows through said breathing tube, and spring means associated with said movable end plate for counteracting the resistance of said bellows to expansion and contraction.

2. The structure of claim 1 in which positioning means are provided for maintaining said movable plate to one side for a constant reference point which is counter-balanced until air is introduced through said breathing tube.

3. The structure of claim 1 in which recording means includes a horizontally movable member connected to said movable wall, said member having a vertical portion providing a vertical elongated slot therein, an upstanding rocker member having a vertically elongated slot therein and being provided with a stylus, and an adjustable connecting element extending between said slotted members for pivotally connecting the same together at any point along the slots thereof.

4. The structure of claim 1 in which said breathing tube comprises a pair of concentric inner and outer tubes defining inner and outer flow passages therethrough, and check valve means provided by one of said inner and outer tubes for preventing the flow of air therethrough in one direction into said bellows.

5. In a respiration testing device, a horizontal bellows having a movable end plate and a stationary end plate, a breathing tube communicating with the interior of said bellows, support means supporting said movable end plate for swinging movement about a horizontal axis extending along the plane of said movable plate, said support means supporting said movable plate for movement between extreme positions on opposite sides of an intermediate vertical position wherein said bellows is in a neutral uncompressed and unexpanded state, and spring means operatively associated with said movable end plate to offset the resistance of said bellows to expansion and contraction.

6. The structure of claim 5 in which said support means supports said end plate for swinging movement about a horizontal axis spaced below said bellows.

7. The structure of claim 5 in which positioning means are provided for maintaining said movable plate to one side of said intermediate position until air is introduced into said bellows through said breathing tube.

8. The structure of claim 5 in which said breathing tube comprises a pair of concentric inner and outer tubes defining inner and outer flow passages therethrough, said inner tube being provided with check valve means for preventing the flow of air into said bellows through said inner tube.

9. In a respiration testing apparatus, a casing having a chamber therein, a horizontal bellows equipped with a pair of vertical end plates and disposed within said chamber, one of said end plates being fixed to said casing and the other of said end plates being horizontally movable, an upstanding support arm connected at its upper end to said movable end plate and being pivotally mounted adjacent its lower end to permit horizontal movement of the vertical end plate from opposite sides of an intermediate position wherein said arm is vertically disposed and said bellows is in a neutral state, a breathing tube communicating with said bellows, and spring means operatively associated with said movable end plate to offset the resistance of said bellows to expansion and contraction.

10. The structure of claim 9 in which positioning means are provided for maintaining said movable end plate to one side of said intermediate position for a constant reference point until air is introduced through said breathing tube.

11. The structure of claim 10 in which said positioning means includes a stop provided by said casing and releasably engageable with a portion of said movable end plate for holding the same in place.

12. The structure of claim 9 in which said breathing tube comprises a pair of concentric inner and outer tubes defining inner and outer flow passages therethrough, and check valve means provided by one of said inner and outer tubes for preventing the flow of air therethrough in one direction into said bellows.

13. In a respiration testing device, a casing having a chamber therein, a horizontal bellows mounted within said chamber, said bellows being provided with an end plate adapted to move horizontally when said bellows expands and contracts, spring means extending between said casing and said movable end plate to offset the resistance of said bellows to expansion and contraction, and a breathing tube communicating with said bellows.

References Cited in the file of this patent

UNITED STATES PATENTS

| | | |
|---|---|---|
| 2,655,914 | Jones | Oct. 20, 1953 |
| 2,697,430 | Jones | Dec. 21, 1954 |
| 2,701,560 | Jones | Feb. 8, 1955 |
| 2,707,947 | Traugott | May 10, 1955 |
| 2,933,082 | Billin | Apr. 19, 1960 |